UNITED STATES PATENT OFFICE.

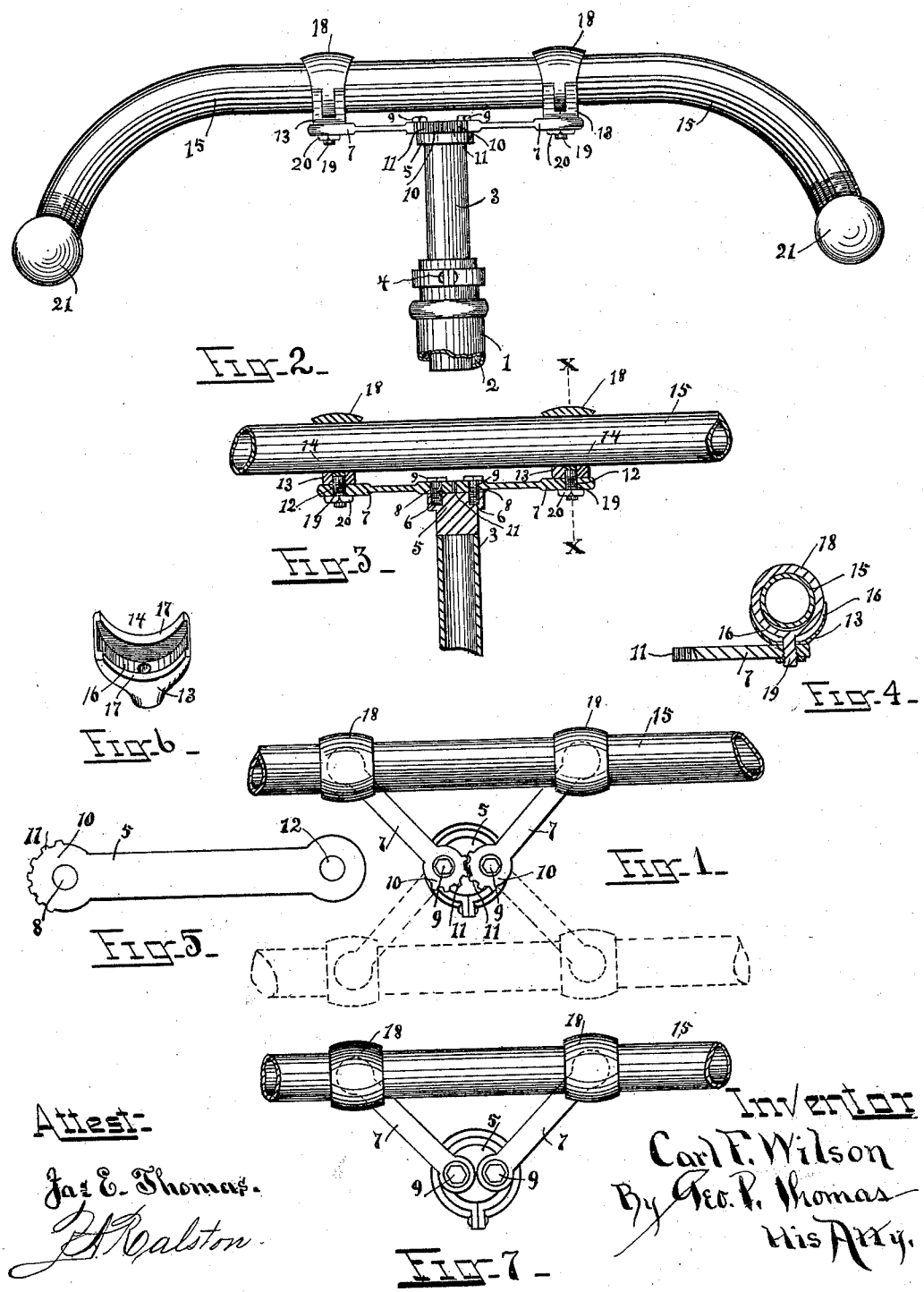

CARL F. WILSON, OF WEST BAY CITY, MICHIGAN.

ADJUSTABLE HANDLE-BAR FOR BICYCLES.

SPECIFICATION forming part of Letters Patent No. 598,299, dated February 1, 1898.

Application filed May 14, 1897. Serial No. 636,433. (No model.)

*To all whom it may concern:*

Be it known that I, CARL F. WILSON, a citizen of the United States, residing at West Bay City, in the county of Bay and State of Michigan, have invented certain new and useful Improvements in Adjustable Handle-Bars for Bicycles, of which the following is a specification, reference being had to the accompanying drawings, and to the figures of reference marked thereon, which form a part of this specification.

This invention relates to handle-bars for bicycles, and pertains more particularly to that class of handle-bars which are rendered adjustable in relation to the steering-head.

The object of the invention is to provide a handle-bar which can be easily adjusted to a desired position, either forwardly or rearwardly, to suit the various riders of the wheel.

Another object of the invention is to provide a support for the handle-bar of a bicycle which, while retaining the handle-bar rigidly against a lateral vibration, at the same time allows a vertical movement of the same, whereby the usual vertical vibration or "quiver" of the handles as the wheel passes over uneven surfaces is avoided; and another object of the invention is to provide a means for attaching a handle-bar to a bicycle steering-post in such a manner that the location of the bar in relation to the steering-post may be changed as desired, and at the same time so as to provide strong and solid supports which operate to brace the extending portions of the handle-bar against a lateral vibration and strain.

The invention consists, chiefly, in two supporting-arms having their adjacent ends pivotally secured upon the steering-head of a bicycle and with their opposite ends reaching outwardly and adjustably attached to the handle-bar for supporting the same in position; and the invention also consists in the combination and arrangement of the several devices used and in the construction and arrangement of the same, as will be set forth in detail in the following description, and which will also be especially mentioned in the claims.

My invention is illustrated in the accompanying drawings, in which the same reference characters will be found indicating the same parts throughout the several views.

Figure 1 represents a plan view of a handle-bar for a bicycle with my improvement attached thereon and showing the handle-bar adjusted to a position forward of the steering-post. Fig. 2 is a rear side view of the same. Fig. 3 is a vertical section of the supporting devices, taken through the center of the same, and with the supporting-arms in a laterally-extended position. Fig. 4 is a vertical transverse section of the supporting devices and the handle-bar, taken at line $x\,x$ in Fig. 3. Fig. 5 is a plan view of one of the supporting-arms detached. Fig. 6 is a view of the clamping device for the handle-bar detached. Figs. 7 and 8 are plan and rear views of the adjusting devices in a modified form.

1 represents the steering-post of a bicycle of the usual form, and this post is provided with a central opening 2, into which is passed the supporting-post 3, and which post is secured in the desired vertical position and against revolution within the opening by a set-screw 4 or other suitable means, as desired.

Upon the upper end of the post 3 is arranged a head portion 5, which extends laterally on opposite sides of the post and is provided with a screw-threaded opening 6, for a purpose to be presently explained.

7 are supporting-arms arranged to extend horizontally outward, and with their inner adjacent ends resting upon the upper surface of the head portion 5, and these ends are provided with the vertical openings 8, through which and into the openings 6 are passed the tap-bolts 9 in a manner to retain the arms firmly in position, but still to allow the arms to turn on the bolts. The pivoted ends of these arms are each provided with the contour of a segment of a circle 10, and each segment has a series of laterally-projecting teeth 11, which are arranged to intermesh with each other for retaining the arms in a proper position in relation so each other, and so that as one of the arms is moved around its pivot a corresponding movement of the other arm is effected, and whereby the movement of either arm produces a like movement of the other arm in the opposite direction, so that a proper position of the arms in relation to each other and to the supporting-head is maintained.

The outer ends of the arms 7 are provided with vertical openings 12, and upon the upper surface of these outer ends is arranged the saddle portions 13, of which the upper surfaces 12 are of a concave form and fitted to the handle-bar 15, which rests thereon.

The middle portions of the supporting-surfaces 14 are each provided with a transverse recess 16, leaving the lateral portions 17 on each side of the recess for contact with the under side of the handle-bar which rests thereon, and 18 are clamping-collars which surround the handle-bar and are arranged with their lower portions fitted to rest within the recesses 16, and these collars are also provided with downwardly-projecting threaded portions or extensions 19, which, first passing through the saddles 13 and the openings 12, are provided on their ends with the nuts 20, which when turned upon the threaded ends of the extension portions and against the under side of the arms 7 serve to draw the clamping-collars downwardly upon the upper side of the handle-bar, and at the same time draw the handle-bar firmly upon the portions 17 of the saddles, and thereby firmly clamping the outer ends of the arms 7 in position against a lateral movement, and also retaining the handle-bar rigidly in position against turning within the collars.

In order to allow the usual slight vertical movement of the supporting-head to obtain without transmitting the vibration through the handle-bar to the handles 21 upon the ends thereof, the central portions of the arms 7 are reduced in their vertical dimension, so as to provide a slight springing action of the arms, with the result that when the wheel is run over uneven surfaces the frame and supporting-head may have a limited vertical vibration, while the springs arranged in the arms allow the handle-bar and the hands of the rider clasping the handles to move steadily along on the same plane.

To adjust the handle-bar to any position, the nuts 20 are loosened and the bar can then be adjusted to any desired position in the rear, or in front of, or directly over the steering-post, the saddles and the clamping-collars sliding along the handle-bar to accommodate the required angle of the arms, and when the desired position is reached the nuts are again tightened to clamp the handle-bar in position.

It will be noticed that by arranging the inner ends of the arms with the segment-teeth 10 intermeshing with each other a uniform movement of the arms is provided, so that but little attention need be paid to this part of the adjustment, although, as will be seen in Fig. 7, these segments and teeth are not entirely necessary, as when the teeth are omitted the same adjustment can be made by giving attention to retaining the handle-bar in its proper position transversely with the frame while the adjustment is being made, the arms and all of the other parts being the same as before described.

It will also be noticed that by the use of my improvement the handle-bar may be adjusted to a great variety of positions to suit the convenience and desire of various riders and for tall or short people, and that the height and position of the handles can be easily changed when desired by loosening the clamping-nuts and then rolling the handle-bar to bring the handles to the desired position, and at the same time the arms reaching outwardly and being secured to the handle-bar in locations away from the center of the same provides a strong bracing attachment for the handle-bar, which prevents a lateral vibration of the same and provides a rigidity of the handle-bar which greatly assists in the proper manipulation of the wheel.

While I have described and shown a detailed construction of certain means for attaching the supporting-arms to the supporting-head and also certain devices for attaching the outer ends of the arms to the handle-bar, I wish it understood that I do not confine my invention entirely to the means herein shown for these purposes, as many well-known and common devices of a different construction may be substituted for these parts, and the most essential and important feature of the invention is the extended supporting-arms which carry the handle-bar in a manner to render it adjustable to different positions in relation to the steering-post.

Having described my improvement, what I claim as my invention, and desire to secure by Letters Patent, is—

1. The combination with the steering-post of a bicycle, and the handle-bar, of the outwardly-extended arms pivotally secured by one end to the top of said steering-post, and adjustably secured by their opposite ends to said handle-bar, substantially as set forth.

2. The combination, in an adjustable handle-bar, of the steering-post provided on its upper end with a supporting-head, and the handle-bar, with the extended supporting-arms having their inner ends pivotally secured to the said supporting-head, and with their outer ends adjustably secured to the said handle-bar, and means for imparting a simultaneous movement to the said arms around their pivots, substantially as set forth.

3. The combination of the steering-post of a bicycle provided on its upper end with a supporting-head, and the handle-bar, with the extended supporting-arms having their inner ends pivotally secured to the upper portion of said supporting-head and provided on the edges of each of said pivoted ends with a segment of gear for intermeshing with each other, and having the outer ends of said arms adjustably secured to said handle-bar, substantially as set forth.

4. The combination of the steering-post of a bicycle provided on its upper end with a supporting-head, the extended supporting-arms having their inner ends pivotally secured to said supporting-head, with the saddle portions resting upon the upper surface of the outer ends of the said supporting-arms and provided on their upper portions with concave supporting-surfaces, the handle-bar resting in said concave supporting-surfaces, and devices for clamping the handle-bar upon the saddles, substantially as set forth.

5. The combination of the steering-post of a bicycle provided on its upper end with a supporting-head, the extended supporting-arms having their inner ends pivotally secured to said supporting-head and provided on their outer ends with vertical openings, with the saddle portions having their lower portions resting upon the upper surface of the outer ends of said arms and provided on their upper portions with concave supporting-surfaces having central transverse recesses, the handle-bar resting in said concave supporting-surfaces, and the clamping-collars surrounding said handle-bar and with their lower portions resting in said transverse recesses and provided with downwardly-projecting extension portions passed through said saddles and openings in the bars, and provided on their projecting threaded ends with clamping-nuts for holding the said arms and handle-bar upon the saddles, substantially as set forth.

6. The combination with the steering-post of a bicycle, and the handle-bar, of the outwardly-extended arms pivotally secured by one end to the top of said steering-post, and with their opposite ends adjustably secured to said handle-bar, and with the middle portions of said arms reduced in their vertical dimension, for allowing said arms to spring in a vertical direction, substantially as set forth.

In witness whereof I hereunto affix my signature this 10th day of May, 1897, at Bay City, Michigan.

CARL F. WILSON.

Witnesses:
GEO. P. THOMAS,
JAS. E. THOMAS.